United States Patent [19]

Uroshevich

[11] 4,273,103
[45] Jun. 16, 1981

[54] SOLAR ENERGY RECEIVERS

[75] Inventor: Miroslav Uroshevich, Cincinnati, Ohio

[73] Assignee: Alpha Solarco Inc., Cincinnati, Ohio

[21] Appl. No.: 52,086

[22] Filed: Jun. 25, 1979

[51] Int. Cl.³ .............................. F24J 3/02; F28F 1/20
[52] U.S. Cl. .................................. 126/438; 126/449; 126/450; 165/181
[58] Field of Search .............. 126/417, 450, 441, 446, 126/449, 901, 438; 165/179, 181

[56] References Cited

U.S. PATENT DOCUMENTS

| | | | |
|---|---|---|---|
| 2,480,706 | 8/1949 | Brinen | 126/446 |
| 3,943,911 | 3/1976 | Yu | 126/450 |
| 3,994,279 | 11/1976 | Barak | 126/446 |
| 4,006,730 | 2/1977 | Clapham et al. | 126/441 |
| 4,016,861 | 4/1977 | Taylor | 126/446 |
| 4,055,707 | 10/1977 | McDonald | 126/901 |
| 4,076,025 | 2/1978 | Parker | 126/450 |
| 4,116,222 | 9/1978 | Seifried | 126/450 |
| 4,127,103 | 11/1978 | Klank et al. | 126/450 |
| 4,132,222 | 1/1979 | Roark | 126/450 |
| 4,141,339 | 2/1979 | Weinstein | 126/450 |

Primary Examiner—Daniel J. O'Connor
Attorney, Agent, or Firm—Gary M. Gron

[57] ABSTRACT

The disclosure illustrates a receiver for the focused beam component of solar radiation. The receiver comprises an elongated element of heat insulating material and an elongated heat conductive element secured to the insulating element along its marginal edges to form a passage for heat transfer fluid. The heat conductive element has a concave or convex outer surface that has portions normal to reflected solar radiation coming from a range of different directions. Preferably the heat conductive element is formed from a thin walled extrusion which has an internal fin to maximize the surface area of the passage for the heat transfer fluid.

3 Claims, 3 Drawing Figures

FIG-1

SOLAR ENERGY RECEIVERS

The present invention relates to solar energy and more specifically to receivers for solar energy.

The focusing solar collector is noted for its higher efficiency when compared to a flat plate solar collector. In a focusing collector an elongated reflector (prefered in parabolic shape) focuses the incoming parallel beam components of solar radiation along its focal line. A tube of heat conductive material is positioned concentric with the focal line so that the reflected solar energy is concentrated on the tube. A heat transfer fluid is circulated through the tube so that the absorbed solar radiation is transferred in the form of heat to the fluid flowing through the passage.

This type of receiver makes for an efficient unit. One of the reasons is that the radiation heat losses are proportional to outer surface area. Since the surface area of the receiver in a focusing collector is substantially less than that of a flat plate collector the losses are substantially less. In addition, the concentration of the solar radiation provides a substantially greater heat output to the heat transfer fluid and results in higher working temperatures.

In practice, however, the heat input is not as high as it can be due to geometric imperfections in the actual reflector used to focus the solar energy. These imperfections cause the reflected solar energy to be scattered over a band rather than focused along a line. If the receiver is made as small as possible to minimize radiation heat losses, some of the solar energy will even miss the receiver all together. In an attempt to capture the errant solar radiation, secondary reflectors have been proposed as in U.S. Pat. No. 1,880,938. These reflectors attempt to refocus the solar radiation on the receiver so that it may be absorbed. This type of system has its own problems of additional complexity, cost and difficulty in making the secondary reflector focus along a narrow band.

The above problems are solved in accordance with the present invention by a solar energy receiver comprising an elongated element of insulating material. An elongated element of heat conductive material has marginal edges secured to the insulating element to form a passage for heat transfer fluid therebetween. The heat conductive element has a curved and constant cross-sectional outer configuration forming a surface for receiving focused solar radiation. The outer surface has portions that are normal to the focused solar radiation irrespective of the direction from which it comes maximize solar energy absorption.

The above and other related features of the present invention will be apparent from a reading of the description of the disclosure shown in the accompanying drawing and the novelty thereof pointed out in the appended claim.

Throughout this discussion, the receivers will be referred to as elongated, but only a cross sectional view of each will be shown in order to simplify the description of the present invention. It should be understood that the receivers may be made in different lengths according to the specific solar collector requirement and may even have a length that is shorter than its width.

Figure 1:
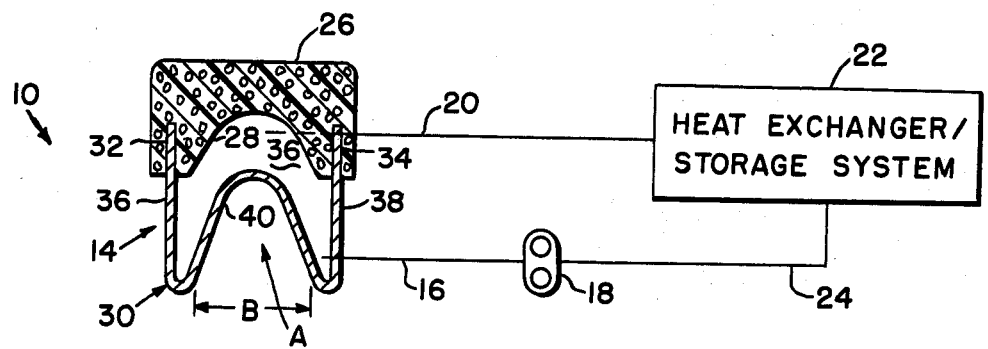
FIG. 1 is a cross-sectional view of a solar collector incorporating a solar energy receiver which embodys the present invention.

Referring to FIG. 1 there is shown a solar energy collector 10 comprising an elongated reflector 12 having a curved (preferably parabolic) shape that focuses the beam component of solar radiation onto an elongated receiver, generally indicated at 14. Receiver 14, has a longitudinal passage, to be described below, that connects with a conduit 16, extending from a pump 18. Pump 18 pressurizes a suitable heat transfer fluid, such as water, for flow through receiver 14 and a return conduit 20 to a heat exchanger/storage system 22. A conduit 24 completes the loop with pump 18. As is usual with focusing solar collectors, the pump 18 is actuated to produce flow through receiver 14 so that the reflected solar radiation striking receiver 14 is converted to heat energy which is either given up in heat exchanger/storage system 22 or retained for use during a sunless period.

As explained before, the reflector 12 cannot be manufactured to an optically perfect shape. As a result, the reflected solar radiation covers a band B along receiver 14, rather than a single focus line, represented by A. In accordance with the present invention, receiver 14 efficiently intercepts this band to maximize the amount of heat energy converted from the solar radiation.

The receiver 14 comprises an elongated element 26 formed from heat insulating material. As illustrated, element 26 is generally rectangular in cross section shape and has a semi-circular elongated trough 28. An elongated element 30 of heat conductive material (e.g. copper or aluminum) is connected to insulating element 26 along its marginal edges 32 and 34 to form between them a passage 36 for heat transfer fluid which connects with conduits 16 and 20. Element 30 has side walls 36, 38 that are integral with a center section 40 having a concave outer surface (preferably parabolic) when viewed in cross section. This surface is coated with a darkening substance such as black chrome. The element 30 has a uniform cross section along its length so that it may be inexpensively formed from an extrusion.

Figure 2:
FIG. 2 is a cross-sectional view of a solar energy receiver showing an alternate embodiment of the present invention.
Figure 2:
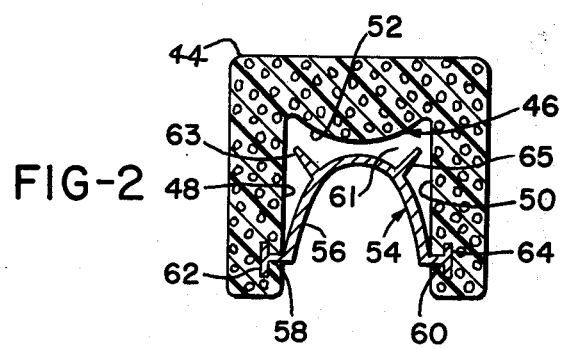

FIG. 2 shows an alternate embodiment of the receiver which comprises an elongated heat insulating element 44, also having a rectangular cross section, but having an elongated trough 46 having straight side walls 48, 50 and a convex floor 52. An elongated element of heat conductive material 54 has a uniform cross section which defines a concave (preferably parabolic) outer surface 56. Element 54 is secured to walls 48, 50 of element 44 along marginal edges 58, 60 respectively to form an elongated passage 61 for heat transfer fluid. Elongated flanges 62, 64 on edges 58, 60, respectively enable a more secure connection when they are embedded in element 44. Element 54 additionally has integral elongated fins 63,65 formed along the inner surface thereof which extend into passage 61 so that their edges are positioned closely adjacent the junction between the side walls 48,59 and convex floor 52 to increase the surface area of element 54 that is exposed to passage 61. As a result, the heat transfer to the fluid is maximized.

Figure 3:
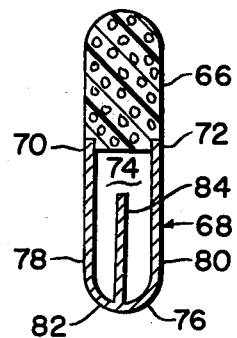
FIG. 3 is a cross-sectional view of a solar energy receiver showing still another embodiment of the present invention.

FIG. 3 shows still another receiver which comprises an elongated element 66 of insulating material. An elongated 68 of heat conductive material is secured to element 66 along marginal edges 70, 72 to form a passage 74 for heat transfer fluid. Element 68 has a uniform cross-sectional shape which defines a generally convex outer surface 76 which receives solar radiation. More specifically element 68 has side walls 78, 80 that are integral with a semi-circular center section 82 having an elongated inwardly extending rib 84.

The receivers described above offer substantial advantates in performance and economy of manufacture.

From a performance standpoint, the curved outer surfaces of the heat conductive elements present surfaces that are more nearly normal to the reflected solar rays over band B. As a result, the absorption of solar radiation is increased. The longitudinal fins increase the heat transfer to the fluid by increasing the surface area of the heat conductive element that is exposed to the fluid. Furthermore, the insulating element minimizes radiation heat losses in the direction that faces away from the main reflective surface.

The above receivers are inexpensive to manufacture because the heat conductive element is made from an extrusion and cut to the appropriate length. It is desirable that a black chrome surface be placed on the exterior surface of the heat conductive elements. This is easily done when these elements are formed from extrusions. The insulating elements are preferably formed from a material such as a nitrogen blown polysulfone which chemically cures around and/or adheres to the marginal edges of the receivers. It is a simple matter to place appropriate end plates on the insulating and heat conducting elements to form a completed receiver assembly.

While a preferred embodiment of the present invention has been described, it should be apparent to those skilled in the art that it may be practiced in other forms without departing from the spirit and scope thereof.

Having thus described the invention, what is claimed as novel and desired to be secured by Letters Patent of the United States is:

1. A collector for solar radiation comprising:
   an elongated reflector for receiving the beam component of solar radiation and focusing it generally along a band;
   an elongated element of nitrogen blown polysulfone heat insulating material having an elongated trough formed therein by opposed straight side walls joined by a convex wall, said trough receiving said band of focused radiation;
   an elongated extruded thin wall section element of heat conductive material comprising a curved wall section defining a concave outer wall adjacent to and parallel to said band, said heat conductive element having marginal edges with integral flanges embedded in said insulating element to form a passage for heat transfer fluid therebetween, said heat conductive element having an outer surface for directly receiving the focused solar radiation, said outer surface having portions that are normal to the rays of focused solar radiation within said band to maximize solar energy absorption,
   said heat conductive element having a pair of elongated integral fins formed along the inner surface thereof, the edges of said fins being positioned closely adjacent the junction between the side walls and said convex wall in said trough for maximizing the surface area of said heat conductive element is exposed to heat transfer fluid;
   whereby heat transfer to said fluid is maximized.

2. Apparatus as in claim 1 wherein said conductive element has a parabolic concave surface.

3. Apparatus as in claim 1 wherein said heat conductive element has a black chrome surface on the outer surface thereof.

* * * * *